P. ROUSSEY.
INDICATING SIGNAL.
APPLICATION FILED DEC. 15, 1919.
1,370,487.
Patented Mar. 1, 1921.
2 SHEETS—SHEET 1.
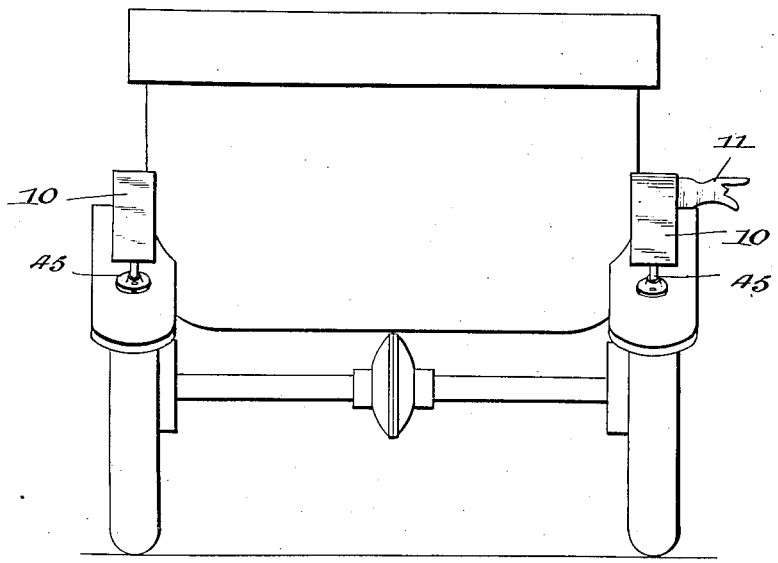
Fig. 1.
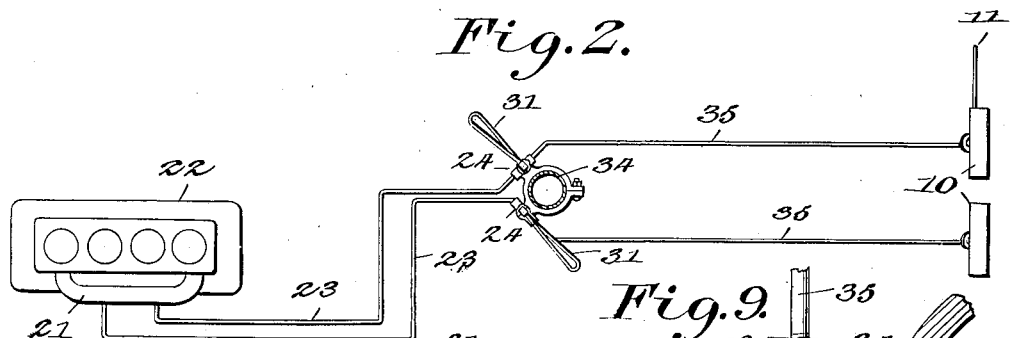
Fig. 2.
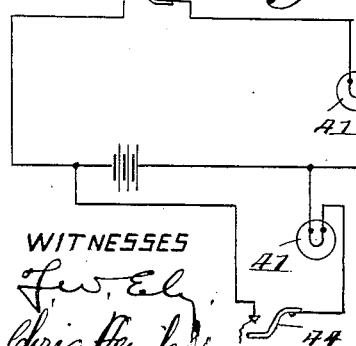
Fig. 10.
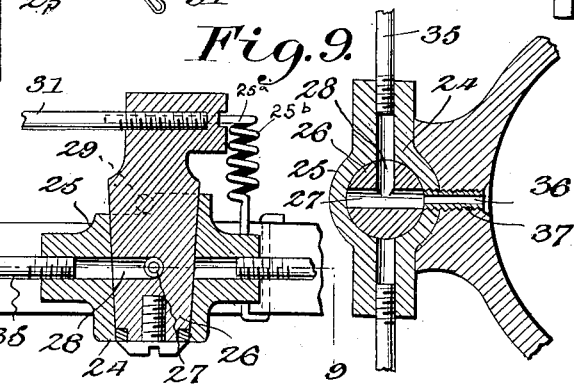
Fig. 9.
Fig. 8.
WITNESSES
INVENTOR
Paul Roussey.
BY
Victor J. Evans
ATTORNEY

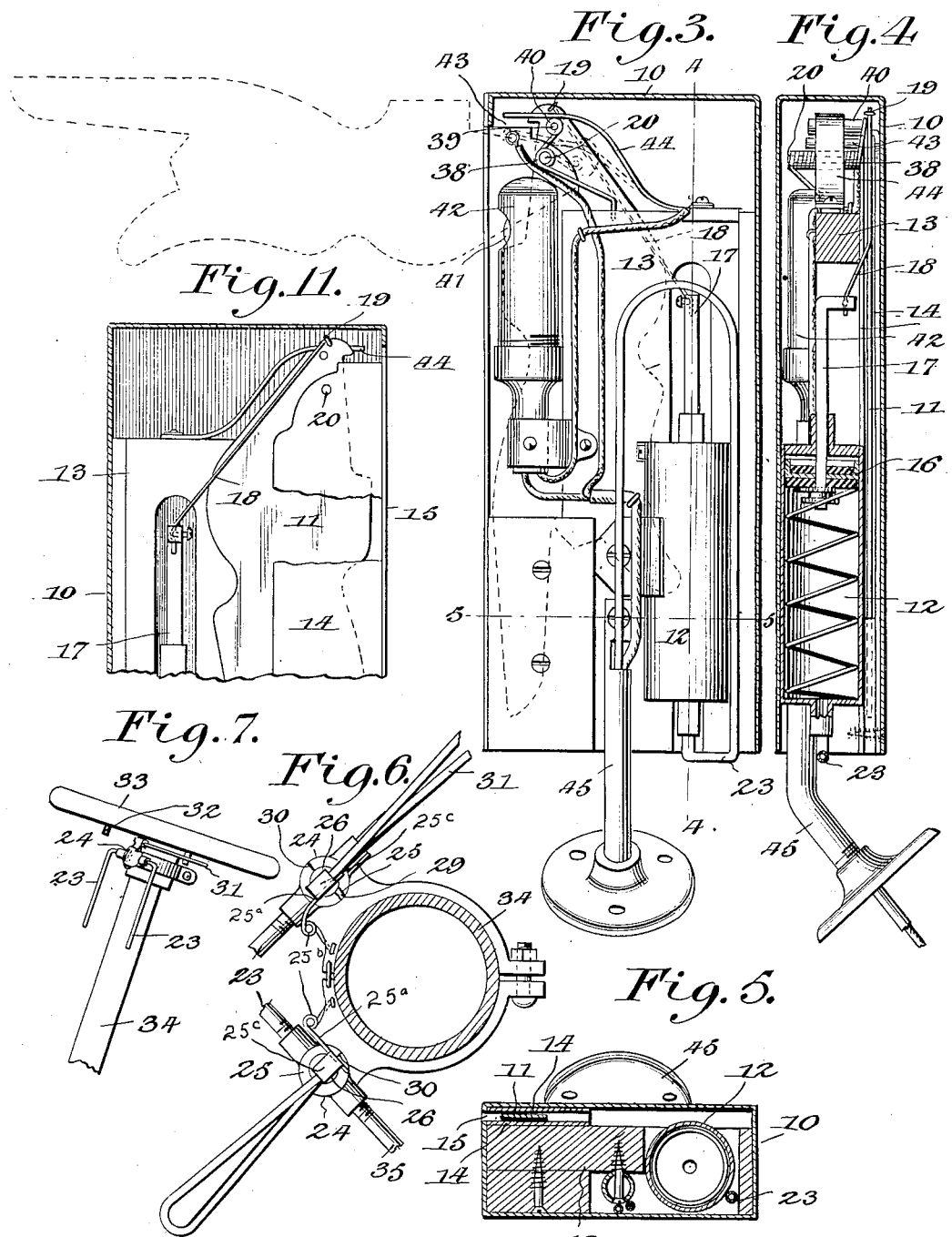

UNITED STATES PATENT OFFICE.

PAUL ROUSSEY, OF BROOKLYN, NEW YORK.

INDICATING-SIGNAL.

1,370,487.   Specification of Letters Patent.   Patented Mar. 1, 1921.

Application filed December 15, 1919. Serial No. 344,887.

*To all whom it may concern:*

Be it known that I, PAUL ROUSSEY, a citizen of the United States, residing at Brooklyn, in the county of Kings and State of New York, have invented new and useful Improvements in Indicating-Signals, of which the following is a specification.

This invention relates to indicating signals and is particularly intended for use upon automobiles.

Some of the objects of the invention are:— to provide a simple device of novel operation for indicating the direction a vehicle equipped with the device is to travel in from a straight course; to produce a device for use upon an automobile and embodying means responsive to the force of suction as created preferably in the manifold of the automobile engine for displaying a signal indicative of the course the vehicle is about to travel; to produce a device which embodies signal operating means responsive to the force of suction, the operation of which is controlled by suction controlling means, said control means being operable by the movement of the steering wheel of the automobile; to provide a device for an automobile which embodies suction control means that is correlated, in part, with the steering wheel so that the movements of the steering wheel for turning the automobile either to the "right" or "left" will result in the concealment of the particular signal which was previously in an indicating position; to produce a device in which the signals have the rays of an electric lamp reflected upon them automatically and simultaneously as the signals—each of them—move to an indicative position. With these and other objects in view the invention resides in the provision, arrangement and combination of elements more fully described in the specification hereunto annexed and illustrated in the accompanying drawings, in which:

Figure 1 is a rear elevation of an automobile showing the disposition of the signals.

Fig. 2 is a diagrammatic view illustrating most particularly how the force of suction for the signal operating means is derived and also illustrates the suction control means.

Fig. 3 is a vertical sectional view through the casing in which is arranged, the signal, an electric lamp which when lighted reflects its light rays upon the signal, and the signal operating means.

Fig. 4 is a sectional view taken on the line 4—4 of Fig. 3.

Fig. 5 is a transverse sectional view taken on the line 5—5 of Fig. 3.

Fig. 6 is a detail plan view of the suction control means.

Fig. 7 is a side elevation of the suction control means and illustrates more clearly the manner in which the element carried by the steering wheel may come into contact with the lever forming a part of one of the valves forming a part of the suction control means.

Fig. 8 is a vertical view through one of the valves forming a part of the suction control means.

Fig. 9 is a horizontal sectional view taken on the line 9—9 of Fig. 8.

Fig. 10 is a diagrammatic view illustrating an electric circuit, in which there is arranged in series, electric lamps and their respective circuit closers, which lamps illuminate their respective signals as they move to an indicating position.

Fig. 11 is a fragmentary sectional elevation illustrating more clearly a signal and the manner of its connection with a part of its operating means.

This invention contemplates the use of a plurality of signals each being normally concealed within a casing. Signal operating means and an electric lamp is also arranged in each casing. The casing and the parts arranged within the same is arranged at each side of the vehicle at the rear end thereof and is secured in place in any suitable manner to be readily seen from the rear. Suction control means is secured in place upon the steering column of the vehicle and this means is operated by the steering wheel in a manner to be hereinafter described.

The signal operating means includes a plunger, the rod of which is connected to one end of the signal, which signal simulates a hand with a pointing finger. The plunger is disposed within a cylinder. The plunger is acted upon by the force of suction as created preferably in the manifold of the automobile engine, and to permit of such action, a passage, between the manifold and the said cylinder, is established.

The suction control means includes valve levers which are moved at times by hand selectively for allowing the signals to be moved by the force of suction to indicating positions and these levers are moved by a member carried by the steering wheel for allowing the signals to be moved so as to be concealed from view.

To properly carry out this invention, it is preferably desired, to employ in duplication identical elements, such as the signals, the cylinder and its plunger and rod, the electric lamp, and the valve of the suction control means, inasmuch as the force of suction for actuating the two signals—which signals are in fact necessary for the successful operation, in accordance with this invention—may be derived from a common source. Likewise, the electric lamps may have a common source of electrical energy and these lamps are arranged in series in a circuit which contains a plurality of circuit closers also arranged in series. Likewise, the steering wheel will serve for operating both valves of the suction control means, there being a member carried by the steering wheel, which member is adapted to engage the lever of each valve in the operation of the signals. Now, therefore, the use herein of the phrase "suction control means" will be construed as including one or more valves, and the use herein of the phrase "signal operating means" will be construed as meaning one or more cylinders in each of which is disposed a plunger having a rod adapted to be connected with one end of a signal. Since the parts comprised in the present embodiment are arranged in duplication, the following description will be confined to elements with singularity for the sake of convenience.

Referring now, to the drawing, it will be seen that there is provided a casing 10, within which a signal 11 is adapted to be normally concealed. A cylinder 12 is supported by a frame 13. The frame 13 has secured hereto plates 14—14 between which the signal 11 moves. The casing 10 is provided with an opening 15 through which the signal moves to an indicating position. A spring pressed plunger 16 is disposed within the cylinder 12 and said plunger is provided with a rod 17. A flexible member 18 connects the free end of the rod 17 with the signal 11 as at 19, the signal being pivoted as at 20. The cylinder 12 has connection with the manifold 21 of the engine 22 by the use of tubing 23. The tubing 23 forms a passage between the manifold 21 and the cylinder 12 which passage is interrupted only by the plug of valve 24. The valve 24 comprises a casing 25 and a plug 26 arranged for movement in the casing. The plug 26 is provided with a passage 27, so that in one position of the plug 26, a complete passage will be established, for the force of suction from the manifold, between it and the cylinder 12, and so that in the other position to which the plug is adapted to move—the passage—for the force of suction—between the manifold and the cylinder 12 will be disestablished. The plug 26 is also provided with a branch 28 which communicates with the passage 27 for the purpose to appear hereinafter. The plug 26 is provided with a stop pin 29 adapted for engagement with shoulders 30 formed on the valve casing 25. The plug is provided with a lever 31 which is disposed in the path of movement of a member 32 carried by the steering wheel 33. As stated, there are two such valves 24 each being provided with a lever 31. The valve casings are secured in any suitable manner to a member 34, in the nature of a clamping ring for supporting the valves upon the steering column of the vehicle most clearly shown in Figs. 2, 6 and 7 of the drawings.

In order that the signal may be moved to an indicating position, to indicate that the vehicle is to turn either to the right or to the left as the case may be, the lever 31 is first moved by hand so as to move the plug to which said lever is connected to a position to establish the passage between the manifold of the cylinder 12—which passage up to this time has been incomplete—permitting force of suction to act upon the plunger 16 which moves downwardly and thereby causes the signal 11 to be moved to an indicating position as shown in Fig. 1 of the drawings. The vehicle is then—by the use of the steering wheel—turned to the right and the member 32 carried by the steering wheel will engage the particular lever 31 and move the same until the member 32 moves out of contact with said lever which occurs because of the fact that the member 32 and the lever 31 move or describe arcs from different centers. The lever 31 aside from being moved by the member 32 as of a certain degree, is moved to a further degree by the extension 25$^a$ of spring 25$^b$; the extension 25$^a$ acts as a lever on the part 25$^c$ of the plug 26 after the part 25$^c$ assumes a predetermined position with regard to the extension 25$^a$. When the lever 31 has been moved to the further degree spoken of, the extension 25$^a$ will lie against one of the flat faces of the part 25$^c$ in which condition of these parts accidental movement of the plug 26 is prevented. It should now be manifest that the hand operation causes the signal to move to an indicating position, which takes place before the vehicle leaves the straightaway course and that as the vehicle is turned to the right as indicated the member 32 moves the valve lever 31 as explained with the result that the plug 26 will have been moved to a position as shown in Fig. 9 of the drawings wherein the passage between the manifold 21 and the cylinder 12 is disestablished, and in which position of the plug 26, there is established a passage between the part 35 of the tubing 23 and a duct 36 in the screw 37 which serves to secure the valved casing 25 to a member 34 so that atmospheric air may enter the cylinder 12 thus permitting the spring pressed plunger 16 to move upwardly and the signal 11 to be moved between the plates 14 within the casing 10. Movement of the signal 11 to concealment after the force of suction has been removed is caused by a spiral spring 38, one end of which is secured to the frame 13, while its opposite end is secured to a pin 39, which pin is provided with an element 40 of insulating material such as rubber, for a purpose to appear.

In order that the signal 11—when it is moved to an indicating position—may be illuminated when in such position, there is provided an electric lamp 41 whose rays when it is lighted, are reflected through an aperture in the casing upon the signal 12 for the illumination thereof by a reflector 42. As stated hereinbefore, there are to be two of such lamps and these lamps are arranged in an electric circuit in series, one lamp in each casing. The circuit in which these lamps are arranged also includes circuit closers best shown in Fig. 10 of the drawings. Each circuit closer comprises a contact 43 and a resilient contact 44, the contact 44 being held out of engagement with the contact 43 when the signal 11 is in its normal position between the plates 14. As the signal is moved to an indicating position the pin 39 will be caused to move in a downward arcuate path which permits the free end of the resilient contact 44 to engage the contact 43 thus closing the electric circuit causing the lamp to be lighted for illuminating the signal 11 in its indicating position. The illumination of the signal 11 continues only until the signal begins to move to its normal concealed position as will be understood.

The frame member 13 which carries the signal, 11, the cylinder 12 and the lamp 41 is removably fitted in the casing 10, in other words, the casing may be removed to expose these parts by merely sliding the same off the frame. The frame has secured thereto an attaching member 45 which serves for mounting the frame member 13 in its correlated part on the vehicle.

From the foregoing it will be understood that there has been provided a device which is novel in operation and that a force of suction is utilized so moving the signals to indicating positions; that with the device an individual may signify correctly the path over which his vehicle is about to travel in leaving one path of travel for another; that means is provided for illuminating the signals in their indicating positions so that they can readily be seen at night; that the device is simple and adequate for eliminating ordinary mistakes—due to the lack of a practical device of this character—which results in accidents.

What is claimed as new is:—

1. A device as characterized embodying a movable signal, means responsive to the force of suction including a cylinder for moving said signal to an indicating position, and means for controlling the operation of the first mentioned means including passages leading respectively to the said cylinder and the intake manifold of an engine, a valve for establishing and disestablishing communication between said passages, said valve having a lever for its operation in the path of movement of an actuating element, and means for holding the said lever normally out of the path of movement of said element.

2. A device as characterized embodying a casing, a movable flexible signal normally concealed within said casing, means responsive to the force of suction including a cylinder for moving said signal to an indicating position, and means for controlling the operation of the first mentioned means including passages leading respectively to the said cylinder and to the intake manifold of an engine, a valve comprising a casing having ports and a vent therein, the ports being opened to said passages, a plug movable in said casing, passages in said plug, a lever attached to said plug in the path of movement of an actuating element, and means for normally maintaining the passages in said plug opened to said vent and one of said ports and for automatically moving the lever away from the path of movement of said element, the said plug being manually movable to open said passages therein to the first mentioned passages with the lever in the path of movement of said element.

In testimony whereof I have affixed my signature.

PAUL ROUSSEY.